(12) United States Patent  (10) Patent No.: US 7,523,707 B2
Theurer et al.  (45) Date of Patent: Apr. 28, 2009

(54) MACHINE AND METHOD FOR WELDING RAILS OF A TRACK

(75) Inventors: Josef Theurer, Vienna (AT); Bernhard Lichtberger, Linz (AT)

(73) Assignee: Franz Plasser Bahnbaumaschinen - Industriegesellschaft m.b.H., Vienna (AT)

( * ) Notice: Subject to any disclaimer, the term of this patent is extended or adjusted under 35 U.S.C. 154(b) by 260 days.

(21) Appl. No.: 11/416,814

(22) Filed: May 3, 2006

(65) Prior Publication Data

US 2006/0261044 A1 Nov. 23, 2006

(30) Foreign Application Priority Data

May 18, 2005 (EP) ................... 05104174

(51) Int. Cl.
*E01B 11/44* (2006.01)
*E01B 27/17* (2006.01)
*E01B 29/04* (2006.01)
*H05B 1/00* (2006.01)

(52) U.S. Cl. ............... 104/15; 104/7.1; 104/7.2; 219/53

(58) Field of Classification Search ............ 104/2, 104/7.1, 7.2, 15; 219/53, 55; 254/43, 44, 254/228, 230
See application file for complete search history.

(56) References Cited

U.S. PATENT DOCUMENTS

| 3,635,164 | A | * | 1/1972 | Patton | 104/307 |
| 4,236,453 | A | * | 12/1980 | Collen | 104/15 |
| 4,272,664 | A | * | 6/1981 | Theurer | 219/53 |
| 4,929,816 | A | * | 5/1990 | Theurer et al. | 219/53 |
| 4,983,801 | A | * | 1/1991 | Theurer et al. | 219/54 |
| 5,136,140 | A | * | 8/1992 | Theurer et al. | 219/161 |
| 5,222,435 | A | * | 6/1993 | Theurer et al. | 104/2 |
| 5,222,653 | A | * | 6/1993 | Joyce et al. | 228/173.6 |
| 5,295,440 | A | * | 3/1994 | Cleveland | 104/7.2 |
| 5,469,791 | A | * | 11/1995 | Theurer et al. | 104/5 |
| 5,511,484 | A | * | 4/1996 | Theurer et al. | 104/2 |
| 5,992,329 | A | * | 11/1999 | Scheuchzer et al. | 104/15 |
| 6,515,249 | B1 | * | 2/2003 | Valley et al. | 219/55 |
| 6,637,727 | B1 | * | 10/2003 | Decker et al. | 254/228 |
| 6,762,390 | B2 | * | 7/2004 | Theurer et al. | 219/53 |
| 6,852,940 | B1 | * | 2/2005 | Muhlleitner | 219/55 |
| 2006/0219123 | A1 | * | 10/2006 | Theurer | 104/2 |
| 2006/0261044 | A1 | * | 11/2006 | Theurer et al. | 219/53 |
| 2006/0288899 | A1 | * | 12/2006 | Theurer et al. | 104/2 |

FOREIGN PATENT DOCUMENTS

EP 0 326 794 A1 8/1989

* cited by examiner

*Primary Examiner*—S. Joseph Morano
*Assistant Examiner*—Jason C Smith
(74) *Attorney, Agent, or Firm*—Laurence A. Greenberg; Werner H. Stemer; Ralph E. Locher

(57) ABSTRACT

A machine for welding the rails of a track includes a rail pulling device that grips the rail ends and pulls them together so that they can be welded to one another. Two rail clamps provided for gripping the rails are fastened to the rail pulling device. The rail clamps are each vertically adjustable in their position relative to the rail pulling device by way of a respective adjustment drive in a direction extending perpendicularly to a pulling device plane formed by hydraulic drives of the rail pulling device. With this, the rails can be lifted from ties in a simple manner in order to enable the clamping members of the rail pulling device to grip the rails.

1 Claim, 1 Drawing Sheet

MACHINE AND METHOD FOR WELDING RAILS OF A TRACK

CROSS-REFERENCE TO RELATED APPLICATION

This application claims the priority, under 35 U.S.C. § 119, of European patent application No. 05 104 174.7, filed May 18, 2005, which is herewith incorporated by reference in its entirety.

BACKGROUND OF THE INVENTION

1. Field of the Invention

The present invention relates, in general, to a machine for welding rails of a track, including a machine frame mobile on the track, a rail pulling device comprising clamping members and hydraulic drives, and a welding unit. The invention further pertains to a method of welding rails of a track.

2. Description of the Related Art

Machines of this type for welding rails of a track have become known, for example, from U.S. Pat. No. 5,136,140, from European patent publication EP 0 326 794, or from U.S. Pat. No. 4,929,816. The welding operation is assisted by a rail pulling device which pulls the clamped rail ends towards one another with great force to a distance required for the welding process. The rail pulling device is suspended in pendulum-like fashion from a machine frame and is vertically adjustable for being lowered onto the rails in the course of working operations. In order to be able to properly grip the rails, these must first be lifted from the base plates they are resting on. This is done by driving wedges between the base plates and the rail base in a laborious manner.

SUMMARY OF THE INVENTION

It is accordingly an object of the present invention to provide a machine of the specified kind for welding rails of a track which overcomes the disadvantages of the heretofore-known machines of this general type and which enables the rails to be gripped by the rail pulling device in a simplified manner.

With the foregoing and other objects in view there is provided, in accordance with the present invention, a machine for welding rails of a track, the rails extending in a longitudinal direction and resting on ties, the machine comprising:

a machine frame having on-track undercarriages for mobility on the track;

a rail pulling device for gripping rail ends to be welded to one another, the rail pulling device being fastened for vertical adjustment to the machine frame;

clamping members mounted on the rail pulling device for pivoting about pivot axes extending parallel to one another, the clamping members forming two respective pairs, spaced from one another in the longitudinal direction, and having clamping jaws provided for application to the rail;

hydraulic drives connecting the two pairs of clamping members to one another; c two rail clamps for gripping and lifting the rail ends from the ties, each rail clamp being vertically adjustable by means of a respective adjustment drive independently of the rail pulling device; and a welding unit for welding the rails.

In accordance with an added feature of the invention, the rail pulling device includes two transverse beams, and each of the rail clamps is fastened to a respective one of the transverse beams and is adjustable by means of the adjustment drive relative to the transverse beam in a direction extending perpendicularly to a pulling device plane formed by the position of the clamping members.

In accordance with a further feature of the invention, each rail clamp is arranged symmetrically with respect to a plane of symmetry extending perpendicularly to the pulling device plane and centrally between the pivot axes of each pair of clamping members.

In accordance with an additional feature of the invention, an upper end position of the rail clamps is delimited by the pulling device plane.

With the aid of auxiliary rail clamps designed according to the invention, it becomes possible with merely small additional structural expense to quickly grip and lift the rail ends to be welded to one another. Since the rail pulling device needs to be centered above the rails in any case, doing so in an advantageous way causes the clamps fastened to the rail pulling device to be also automatically centered with respect to the rails to be gripped. As a result, a very quick, precise and automatically executable gripping of the rails is assured. Furthermore, the subsequently required gripping of the rails by a centering device, integrated into the rail pulling device, can be carried out entirely automatically and without problems.

A further object of the present invention lies also in creating a method of welding rails of a track, which enables the rail pulling device to more easily grip the rails to be welded.

With the foregoing and other objects in view there is also provided, in accordance with the invention, a method of welding rails of a track, the rails having rail ends resting on ties, the method which comprises:

gripping the rail ends, which are to be welded to one another, by means of rail clamps, lifting the rail ends to distance them from the ties, and delivering the rail ends to the clamping members of a rail pulling device;

clamping the rail ends firmly by means of the clamping members as soon as the rail ends come to lie between the clamping members, and opening the rail clamps;

pulling the rail ends towards one another and welding the rails.

Other features which are considered as characteristic for the present invention will become apparent from the drawing.

Although the invention is illustrated and described herein as embodied in a machine and a method for welding rails of a track it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DETAILED DESCRIPTION OF THE PREFERRED EMBODIMENT

Figure 1:
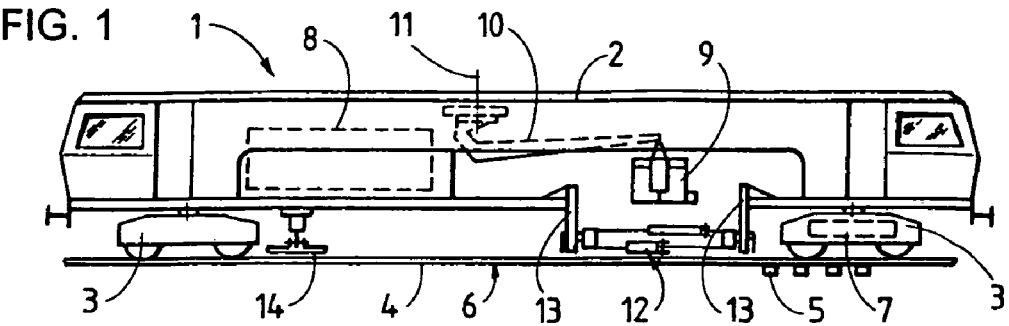
FIG. 1 is a side view of a machine for welding rails of a track, including a rail pulling device.

Referring now to the drawing in detail and first, particularly, to FIG. 1 thereof, there is shown a welding machine 1 which has a bridge-like machine frame 2. With the aid of on-track undercarriages 3, arranged at the ends, and a motive drive 7, the machine 1 is mobile on a track 6. The latter comprises rails 4 and ties 5 and extends in a longitudinal direction. A central power plant 8 including a drive motor, hydraulic pumps and a generator is provided for delivering the energy required for operation of the machine 1.

Centrally between the two on-track undercarriages 3, there is disposed an electric flash-butt welding unit 9, which is connected to a telescopically extendable and vertically adjustable boom 10 which, in turn, is fastened to the machine frame 2 and rotatable about a vertical axis 11. Arranged underneath the flash-butt welding unit 9 is a rail pulling device 12 which is mounted in guides 13 connected to the machine frame 2. Situated in the region of one of the two on-track undercarriages 3 are two lifting jacks 14, spaced from one another transversely to the longitudinal direction, which are designed for being placed upon the upper surface of the ties, thus lifting the machine frame 2 off the track 6.

Figure 2:
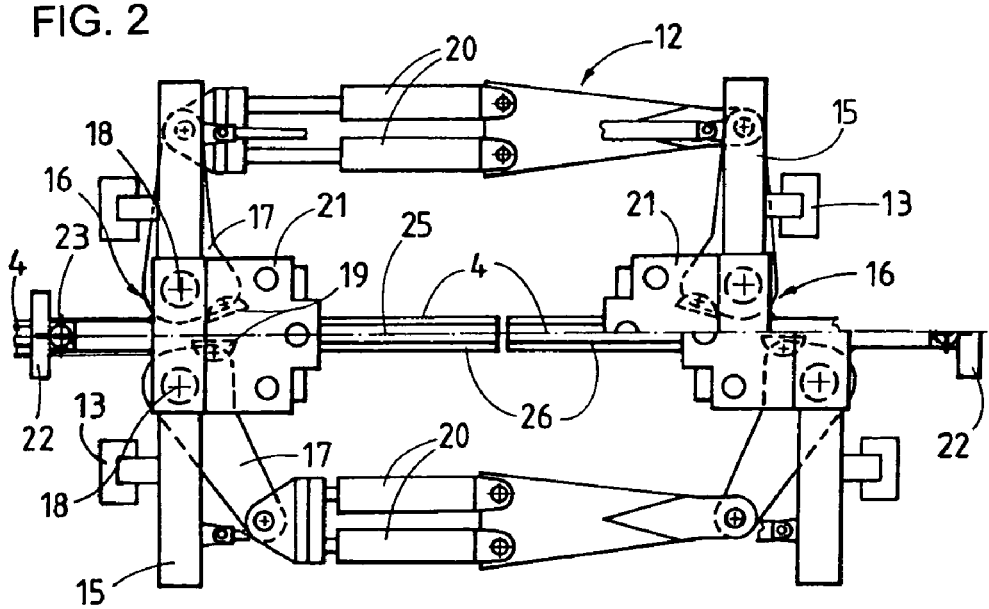
FIG. 2 is an enlarged top view of the rail pulling device of FIG. 1.

The rail pulling device 12, shown on a larger scale in FIG. 2, serves for longitudinally shifting or displacing the rails 4 and comprises two transverse beams 15 which are spaced from one another in the longitudinal direction and extend transversely to the longitudinal direction. Arranged on the transverse beams 15 are clamping members 17, forming respective pairs 16, which are connected in each case to the transverse beam 15 for pivoting about a pivot axis 18 extending vertically or perpendicularly to a track plane of the track 6. The two clamping members 17 depicted in the upper part of FIG. 2 of the drawing are shown in the opened position, while the clamping members 17 in the lower part of FIG. 2 are shown in the closed or clamping position. Each clamping member 17, having pivotable clamping jaws 19 for application to a rail web of the rail 4, is articulatedly connected in the end region opposite the pivot axis 18 to two hydraulic drives 20. On the side facing towards one another, the transverse beams 15 are connected in each case to a centering device 21 by means of which the rails 4 can be centered for the welding operation (the centering device 21 is described in more detail in U.S. Pat. No. 5,136,140).

Fastened to each transverse beam 15 is a respective rail clamp 22 provided for gripping the rail 4 situated thereunder.

Each of the rail clamps 22 is vertically adjustable, with regard to its position relative to the transverse beam 15, by means of a respective adjustment drive 23 in a direction extending perpendicularly to a pulling device plane 24 (indicated in FIG. 3) formed by the hydraulic drives 20. Each rail clamp 22 is arranged symmetrically with respect to a plane of symmetry 25, the latter extending perpendicularly to the pulling device plane 24 and being positioned centrally between the pivot axes 18 of each pair 16 of clamping members 17.

Figure 3:
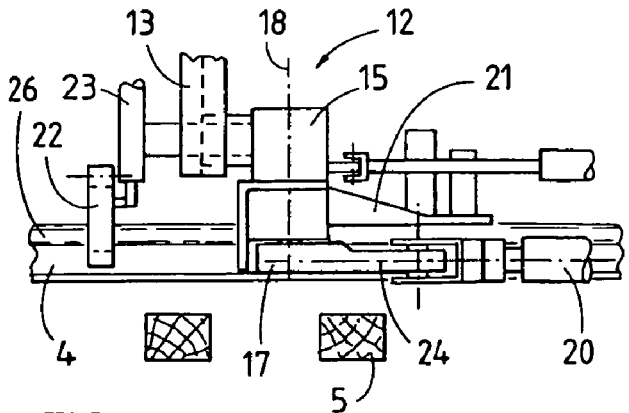
FIG. 3 is a partial side view of the rail pulling device; and»
Figure 4:
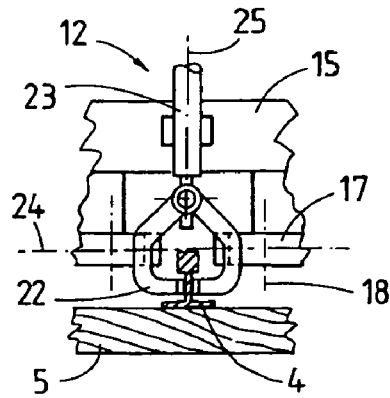
FIG. 4 is a view of the rail pulling device in the longitudinal direction.

According to the depiction in FIGS. 3 and 4, the rail pulling device 12 is shown in a working position spaced vertically from the ties 5. The two rail clamps 22 have been lowered relative to the rail pulling device 12 with actuation of the adjustment drives 23 in order to grip both rail ends 26 of the rail 4 (see FIG. 4) and lift the same to the level of the pulling device plane 24 defined by the position of the clamping members 17 (see FIG. 3). With this, the two rail ends 26 come to lie between the clamping members 17 and are then clamped firmly between the same with the aid of the hydraulic drives 20. Thereafter, the rail clamps 22 are detached from the rail ends 26.

In further sequence, the two rail ends 26 are pulled towards one another by means of the hydraulic drives 20 to a distance required for welding, and the rails 4 are subsequently welded to one another with the aid of the welding unit 9 in the usual manner.

As an alternative to the embodiment shown and described above, it would also be possible to arrange the rail clamps 22 directly on the guides 13.

What is claimed as new and desired to be protected by Letters Patent is set forth in the appended claims and their equivalents.

We claim:

1. A method of welding rails of a track, the rails having rail ends resting on ties, the method which comprises:

providing a rail pulling device and rail clamps height-adjustably mounted relative to the rail pulling device;

gripping the rail ends to be welded to one another by way of the height-adjustable rail clamps, lifting the rail ends to distance the rail ends from the ties, and delivering the rail ends to clamping members of the rail pulling device;

firmly clamping the rail ends with the clamping members when the rail ends come to lie between the clamping members, and opening the rail clamps; and pulling the rail ends towards one another and welding the rails.

* * * * *